United States Patent [19]
Rejsa et al.

[11] Patent Number: 5,167,580
[45] Date of Patent: Dec. 1, 1992

[54] CORN HUSKER AND METHOD OF HUSKING CORN

[75] Inventors: Jack J. Rejsa, Plymouth; Jimmy A. DeMars, Hugo; Robert F. Meyer, Minneapolis, all of Minn.

[73] Assignee: The Pillsbury Corporation, Minneapolis, Minn.

[21] Appl. No.: 675,301

[22] Filed: Mar. 26, 1991

[51] Int. Cl.$^5$ ............................................. A01F 11/06
[52] U.S. Cl. .................................. 460/27; 460/29; 460/34; 460/40; 426/482
[58] Field of Search ............... 460/27, 28, 29, 30, 460/31, 32, 33, 34, 35, 36, 38, 40, 42, 44, 114; 426/482, 518, 481, 483

[56] References Cited

U.S. PATENT DOCUMENTS

| | | | |
|---|---|---|---|
| 2,628,621 | 2/1953 | Murdoch | 460/40 X |
| 2,801,659 | 8/1957 | Carter | 460/34 X |
| 4,062,985 | 12/1977 | Amstad | 426/483 |
| 4,278,097 | 7/1981 | Anderson et al. | 460/28 X |
| 4,340,070 | 7/1982 | Keitel | 460/30 |
| 4,625,735 | 12/1986 | Anderson et al. | 460/32 |
| 4,816,277 | 3/1989 | Frankstein et al. | 426/482 |

Primary Examiner—Terry Lee Melius
Attorney, Agent, or Firm—Kinney & Lange

[57] ABSTRACT

A device for husking corn ears is disclosed. The device removes the husks and silks and at the same time avoids substantial damage to the kernels. The device includes a plurality of rollers and drive means which rotate the rollers at selected speeds in selected directions in a selected sequence. A method of husking corn comprising the steps of cutting the butt end off the ear, and positioning the ear between closely spaced rollers rotating in opposite directions to gently remove the husks is also disclosed.

46 Claims, 13 Drawing Sheets

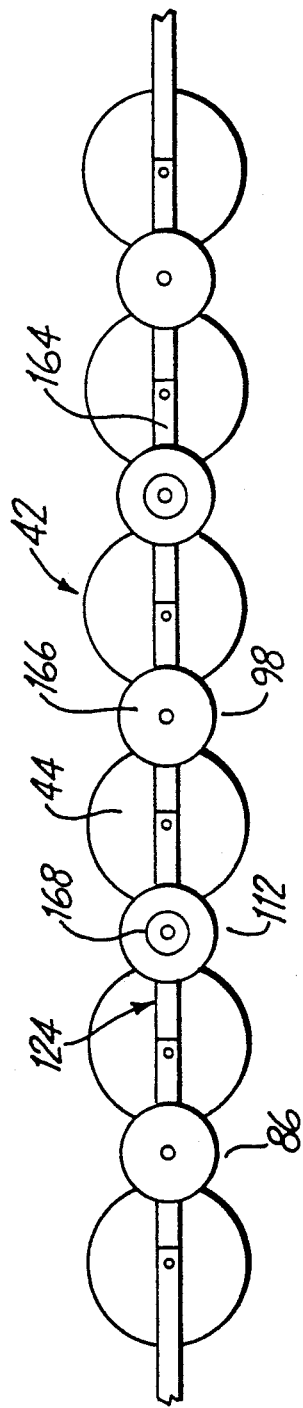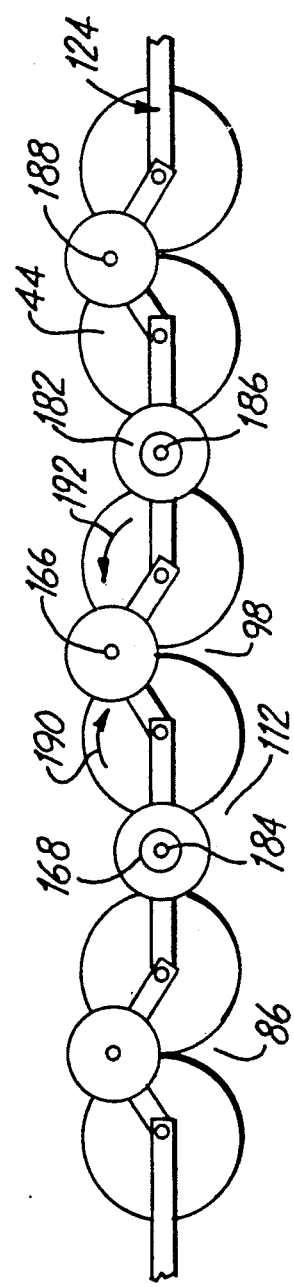

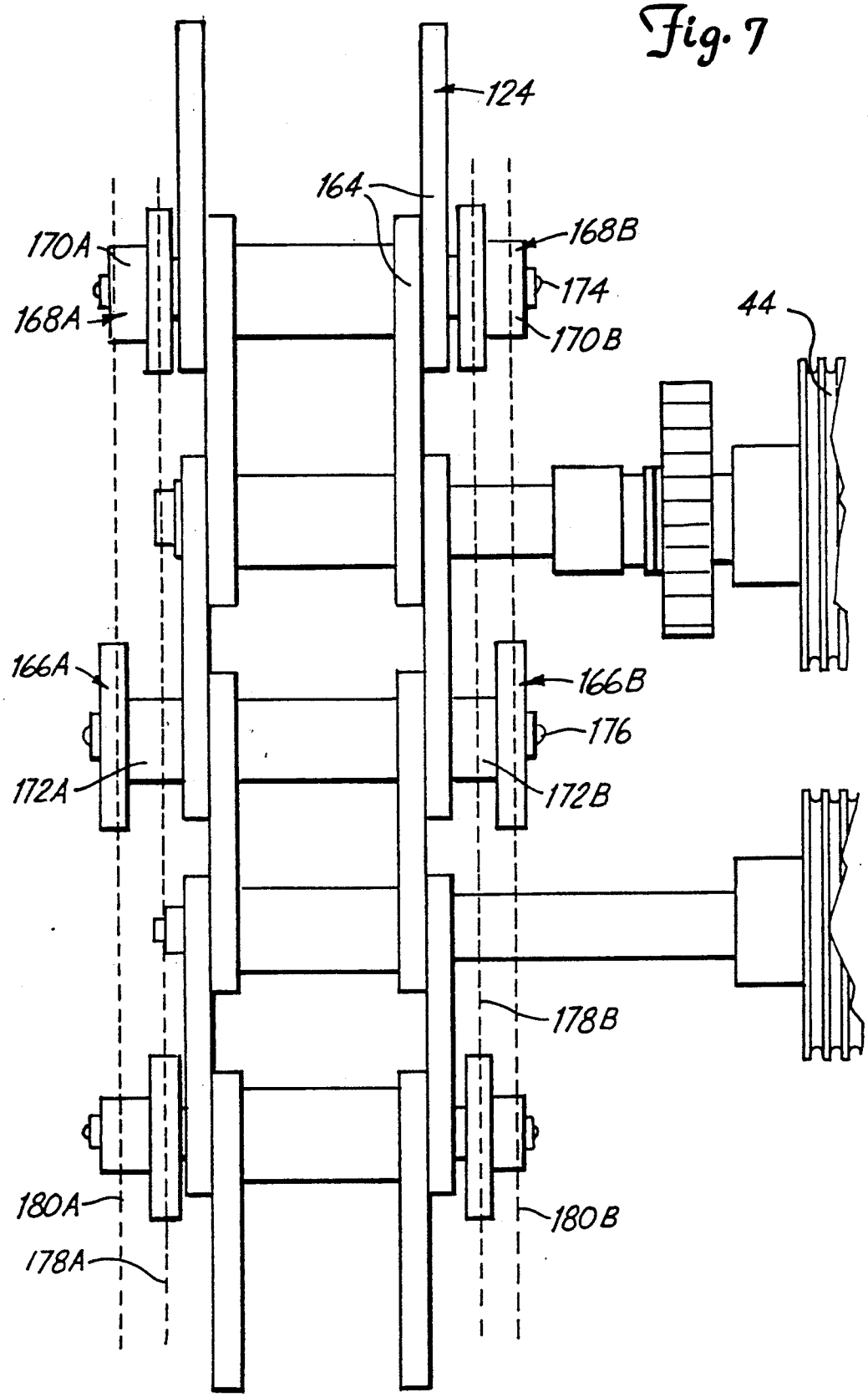

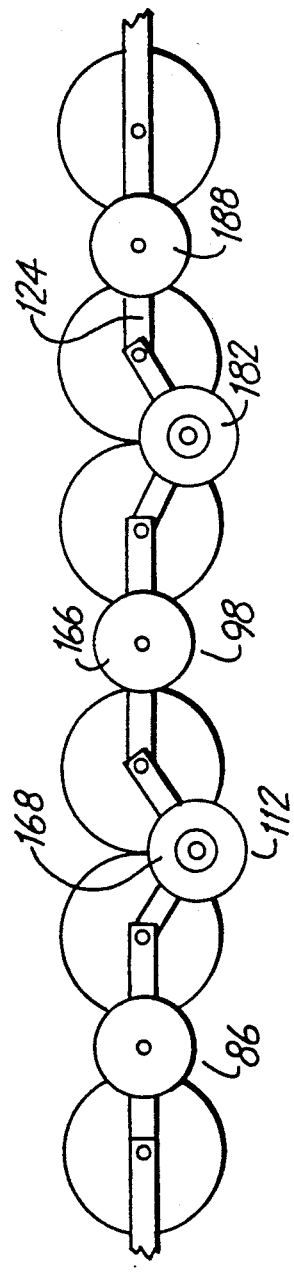
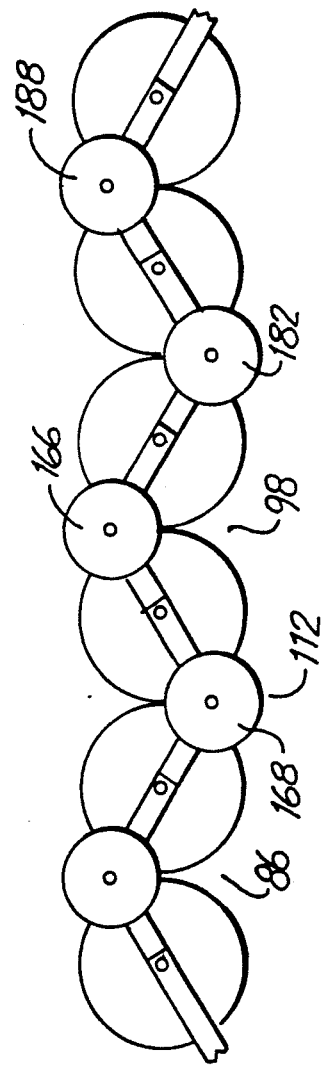

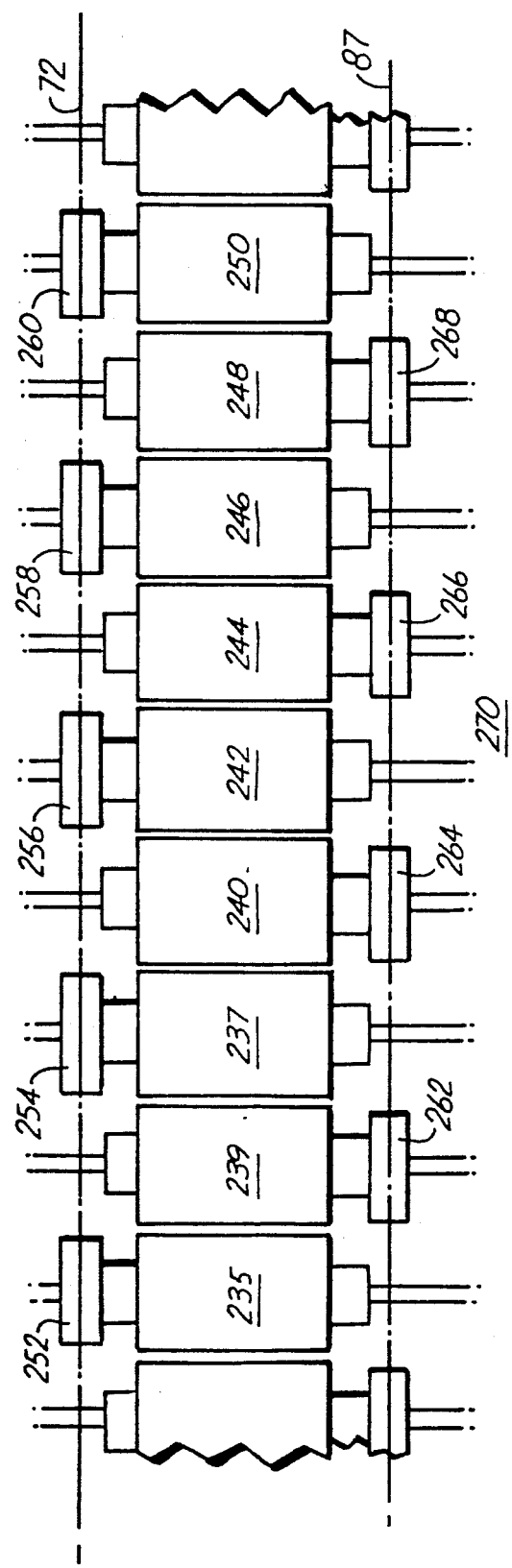
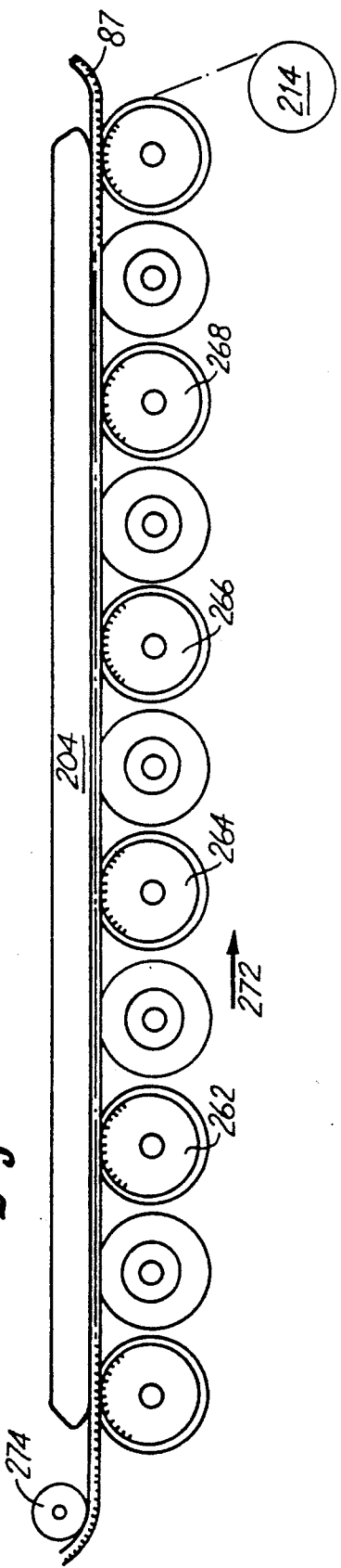
Fig. 15
Fig. 16

CORN HUSKER AND METHOD OF HUSKING CORN

BACKGROUND OF THE INVENTION

The present invention relates generally to devices and methods for removing the husks from ears of corn. In particular, it relates to devices and methods for removing husks from sweet corn ears and at the same time preventing substantial damage to the kernels.

One food product that has gained recent popularity is frozen ear corn. Sweet corn may be grown commercially, husked, blanched, frozen and packaged. There are no devices known to the present inventors which mechanically remove substantially all of the husks and at least a portion of the silks from fresh corn ears without causing excessive damage to the kernels and causing the ears to be unacceptable to the consumer.

One device is known which removes only a portion of the husk of fresh sweet corn for the purpose of making the corn ear more appealing to the purchaser. Frankstein et al. U.S. Pat. No. 4,816,277 describes a device and method of removing a portion of a husk from an ear of corn to expose a few rows of kernels prior to packaging in transparent film. The method includes cutting transversely and partially through a first end of an ear of corn, removing the stem and attached bottom husk, turning the ear approximately 180 degrees, partially cutting through the opposite end, removing the opposite end and attached husks and trimming off the remaining husks. Removal of the husks during both removing steps includes positioning the ear in a nip formed between two cooperating removal rollers which rotate in opposite directions, and pulling the husks and detached ends through the nip of the adjacent removal rollers.

The husker described in Frankstein et al. removes only a portion of the husk of sweet corn to form a product more appealing in appearance to the consumer. This husker is not capable of removing the entire husk.

Other huskers are known which do not require any cutting of the ends prior to removing the husks. One such device comprises a plurality of closely spaced pairs of rotating rollers, each roller rotating in a direction opposite the direction of travel of an adjacent roller. The rollers are covered with a smooth elastomer and lie in an incline plane. The ears are fed into the top as the rollers are spinning. A combination of the rapid rotation of the rollers and the pulling action in the nip between adjacent rollers rapidly spins the corn ears and tears off the husks and silks. A spray of water is provided which washes the waste material through the nips between rollers. This type of device causes the ears to bounce across the rotating rollers, resulting in mechanical damage to the kernels. Known huskers also apply enough force to the attached husks to pull the ear into the nip, which further damages the kernels. The damage is so great that the quality of the ears husked on such a device is unacceptable for selling the product as corn on the ear. However, huskers of this type are suitable for husking corn which is to be cut off the ear and frozen or canned.

SUMMARY OF THE INVENTION

The present invention is a device for removing the husks from an ear of corn and at the same time preventing substantial damage to the kernels. The device includes a support frame, a conveyor capable of traveling along a defined closed path including at least one endless moving member, and a plurality of spaced apart substantially cylindrical rollers mounted for rotation on the endless moving member. The cylindrical rollers are mounted in a direction transverse to the direction of travel of the endless moving member. In the preferred embodiment, two spaced apart endless moving members are provided which are two spaced apart endless chains. The cylindrical rollers are rotationally mounted between the chains in the preferred embodiment.

The device of the present invention also includes a first driving means attached to the support frame for driving the conveyor along a defined path. The most preferred driving means drives both chains and operates to pull the conveyor.

The device of the present invention also includes a second driving means attached to the support frame for driving a first set of rollers in a first rotational direction at a first speed and for driving a second set of rollers in an opposite rotational direction at a second speed. The first and second set of rollers in the preferred embodiment alternate along the conveyor such that adjacent rollers travel in opposite directions. The most preferred second driving means includes a first drive motor for driving the first set of rollers in the first rotational direction and a second drive motor for driving the second set of rollers in an opposite rotational direction. According to the most preferred embodiment, the first set of rollers is driven at a speed which differs between about 5 and about 15 percent from the speed in which the second set of rollers are driven.

The present invention also includes a third driving means which structurally is substantially identical to the second driving means except that the direction of rotation of the first and second set of rollers is reversed.

The present invention also includes a method of removing the husks from an ear of corn comprising the steps of cutting off at least the butt end of an ear, positioning the ear between a pair of adjacent cylindrical rollers, the rollers being closely spaced and adapted for rotational movement in opposite directions. The method also includes the step of rotating each adjacent cylindrical roller at selected speeds and directions sufficient to remove substantially all of the husks while preventing substantial damage to the kernels.

BRIEF DESCRIPTION OF THE DRAWINGS

FIG. 6 is a schematic side-elevational view of the conveyor of a preferred embodiment of the device of the present invention in the expanded position.

FIG. 7 is a greatly enlarged top-plan view of a section of conveyor chain.

FIG. 8 is a schematic side-elevational view of the conveyor of a preferred embodiment of the device of the present invention in a first contracted position.

FIG. 9 is a schematic side-elevational view of the conveyor of a preferred embodiment of the device of the present invention in a second contracted position.

FIG. 10 is a schematic side-elevational view of the conveyor of a preferred embodiment of the device of the present invention in a third contracted position.

FIG. 15 is diagrammatical top-plan view of the conveyor of a preferred embodiment of the present invention.

FIG. 16 is a diagrammatical side-elevational view of the conveyor of a preferred embodiment of the present invention.

DETAILED DESCRIPTION OF THE PREFERRED EMBODIMENTS

The present invention is a device and method for gently removing the husks and silks from sweet corn ears. The present device and method not only substantially completely removes the husks and silks, but the handling of the ears is sufficiently gentle to prevent substantial kernel damage. What is meant by "substantial kernel damage" is mechanical damage due to husking which damages at least five percent of the ears, each damaged ear having at least five adjacent kernels.

The present device and method also protects the kernels by allowing the protective husks to remain on the ear during preliminary processing. According to a preferred method, husking is completed just prior to blanching, freezing, and packaging.

The device and the method of the present invention are suitable for processing a wide variety of corn varieties. In particular, the device of the present invention is suitable for processing all known sweet corn varieties having a moisture content suitable for human consumption. The device and method of the present invention may be used to husk corn varieties having more tightly wound husks and other varieties which have more loosely fitting husks.

Figure 1:
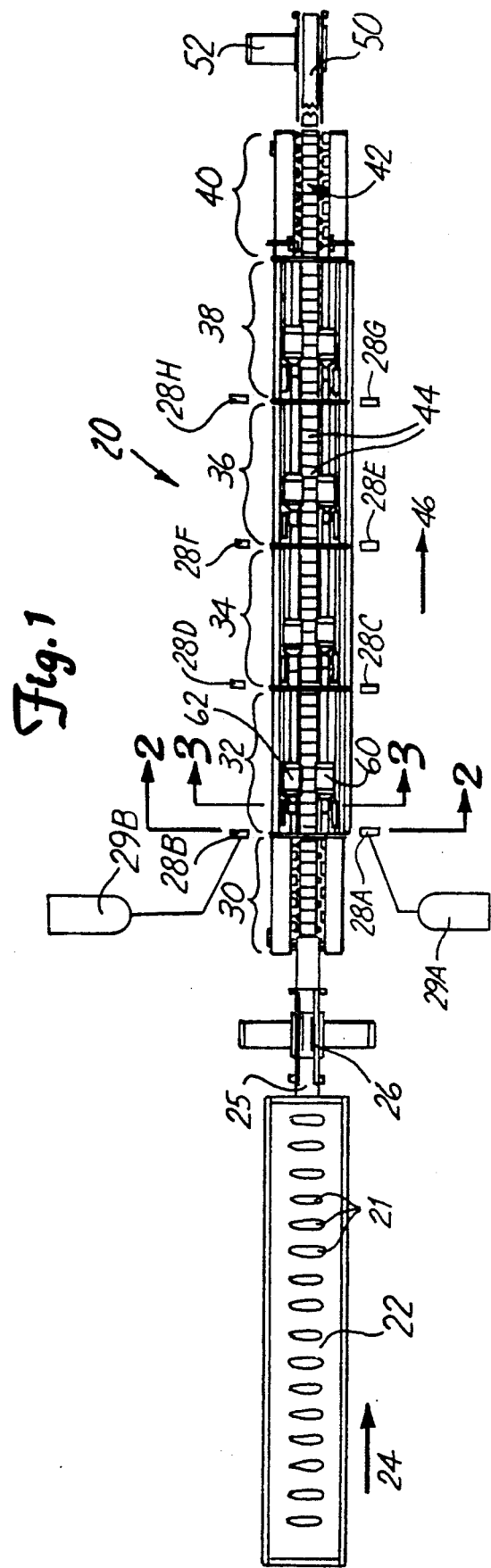
FIG. 1 is a top-plan view of a preferred embodiment of the corn husker of the present invention.

FIG. 1 is a top-plan view of a preferred embodiment of a corn husker 20 of the present invention. A plurality of ears of corn 21 having husks and silks attached thereto are deposited by known means onto a substantially horizontal continuous feed conveyor 22 in the direction of travel shown generally by arrow 24. Each ear 21 is placed on the conveyor 22 such that a central cylindrical axis of each ear is positioned substantially transverse to the direction of movement (shown by the arrow 24) of the conveyor 22. The conveyor 22 is of a type known in the art to individually receive and deliver the ears. An example of such a conveyor is a conveyor having a plurality of transversely spaced apart cross bars, the bar spacing selected such that only one ear may be received between every pair of bars. The ears are optionally aligned transversely and then are delivered to a second conveyor 25 which travels beneath a rotary cutting device 26 which simultaneously trims off both ends of each ear, leaving a plurality of cut ears having a substantially identical length. The cutting device 26 is preferably set to cut each ear to a length of about 5½ inches. By trimming off the butt end of each ear, the husks become detached from the ear which aids in the husking operation which will be described below. What is meant by "detached" for purposes of this disclosure is that the portion of the husks which are attached to the cob are cut off, although the husks remain wrapped around the ear. The rotary cutting device 26 may be any suitable cutter known in the art.

Figure 5:
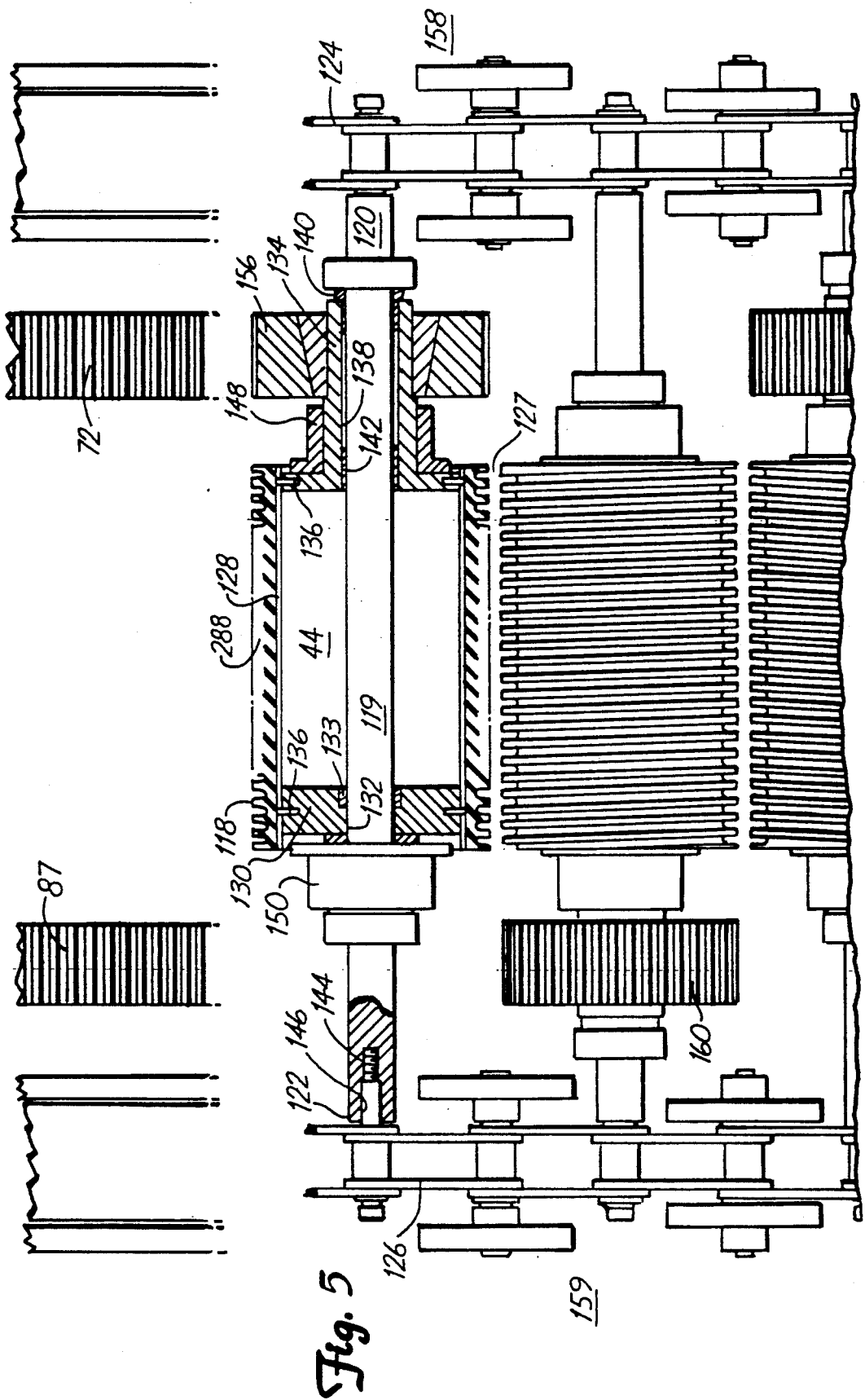
FIG. 5 is a partial enlarged cross-sectional view taken through a roller of the device of the present invention.

The ears are next transferred onto a loading portion 30 of a husking conveyor 42, the conveyor 42 formed from a plurality of closely spaced substantially cylindrical rollers 44 attached to at least one endless moving member which in the preferred embodiment comprises a pair of chains 124 and 126 (shown in FIG. 5). For purposes of this disclosure, the "conveyor" 42 is defined as the portion of the device which moves along a defined path, including a pair of spaced apart chains 124 and 126, and a plurality of transversely mounted, closely spaced, substantially cylindrical rollers 44 (hereinafter referred to as "cylindrical rollers"). During operation, the husking conveyor 42 moves substantially continuously in the direction of arrow 46 along a substantially continuous and substantially fixed path.

Next, the cut ears are optionally passed through a pair of air nozzles 28A and 28B which blow compressed air stored in tanks 29A and 29B in a direction toward each cut end of the ear substantially along a cylindrical axis of the ear, causing the husks to expand slightly and loosen from the kernels. Although this expanding and loosening step is not critical to the operation of the present device, it is believed that this step greatly enhances the efficiency of subsequent husking steps when the husks are tightly wound on the ear. Whether or not this step is necessary is largely dependent upon the corn variety and growing conditions. Some batches of picked corn do not require application of compressed air while others do.

It was surprisingly discovered that providing air pulses was more effective in loosening the husks than was a constant stream of air. Air at between about 20 and about 100 psig was found to be most suitable. Pulse rates between about 0.1 and about 0.2 seconds per ear were also found to be suitable to loosen even the most tightly wound husks.

Figure 2:
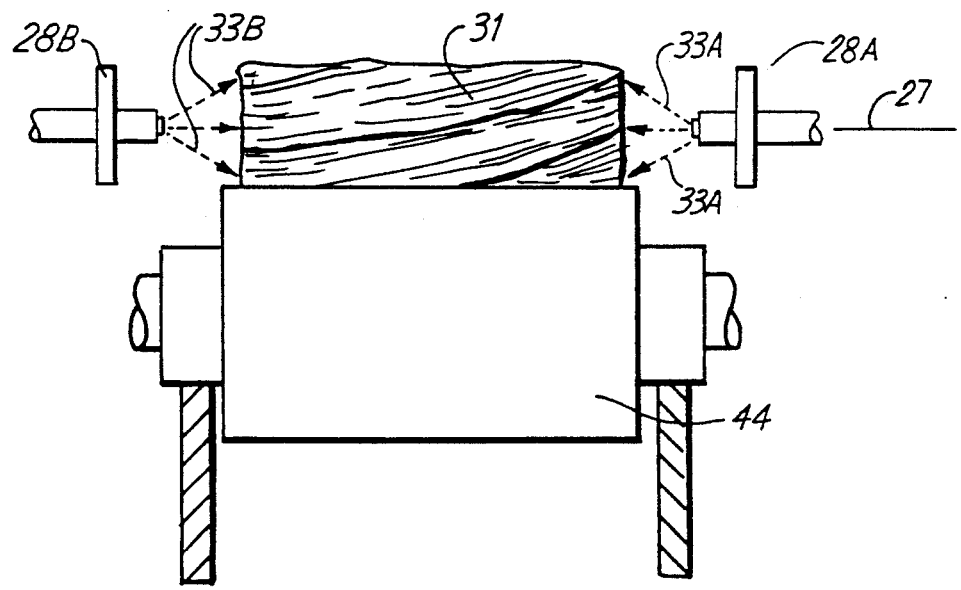
FIG. 2 is an enlarged cross-sectional view taken along line 2—2 as shown in FIG. 1 illustrating the air nozzles.

FIG. 2 is an enlarged cross-sectional view taken along line 2—2 as shown in FIG. 1 which illustrates the most preferred air nozzle 28A and 28B construction. According to the most preferred method, nozzles 28A and 28B are supplied with a quantity of compressed air from pressurized tanks 29A and 29B. Although a tank of pressurized air is used, it is to be understood that any compressed gas source which will not contaminate the corn would be suitable. For example, a tank of compressed nitrogen or an air compressor would also be suitable sources of compressed gas. The nozzles 28A and 28B are positioned to direct a stream of air substantially along a central axis of rotation 27 of the ear 31 proximate the center of each end. Such a nozzle placement aids in lifting the husks away from the kernels as the ear 31 rotates in a nip between the cylindrical roller 44 and an adjacent cylindrical roller (not shown). The most preferred nozzles are available by ordering Whirljet ® Nozzle number AASSTC 1.5 from Spraying Systems Co. of Bellwood, Ill. The most preferred nozzle delivers air following a cone-shaped path such that the air moves toward the husks at an angle as shown by arrows 33A and 33B.

Referring back to FIG. 1, the husking conveyor 42 in the preferred embodiment comprises six portions including a loading portion 30, a first stage 32, a second stage 34, a third stage 36, a fourth stage 38 and an unloading portion 40.

The most preferred device includes a pair of air nozzles 28C and 28D at the entrance end of the second stage 34, a pair of air nozzles 28E and 28F at the entrance end of the third stage 36 and a pair of air nozzles 28G and 28H at the entrance end of the fourth stage 38. Each additional nozzle 28C–28H is fluidly connected to the same air tanks 29A and 29B as are air nozzles 28A and 28B in the preferred embodiment.

In operation, the conveyor 42 picks up cut corn from the conveyor 25. A single ear 21 is placed between each adjacent pair of rollers 44 in an area defined as a nip 127 (shown in FIG. 5). The first through fourth stages 32, 34, 36 and 38 function to remove the husks and silks from the cut ears in a manner which will be described below. After the husked, cut ears exit the unloading portion 40, the ears are optionally transferred to a conveyor 50 and fed through a second cutter 52 for forming smaller size corn ears.

Figure 3:
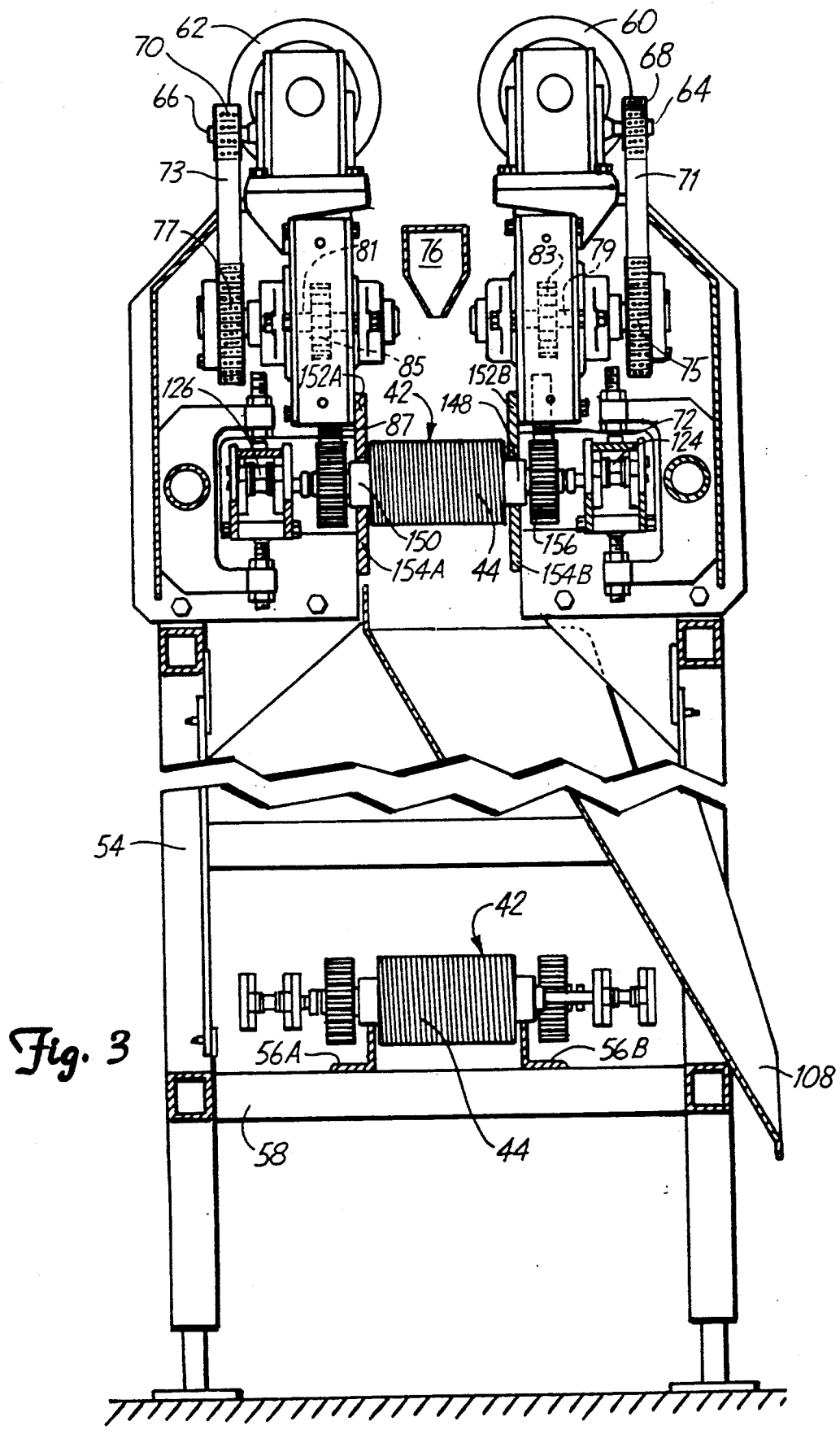
FIG. 3 is a cross-sectional view of the first stage of the husker taken along line 3—3 as shown in FIG. 1.

FIG. 3 is a cross-sectional view of the first stage 32 of a preferred device 20 taken along line 3—3 as shown in FIG. 1. Although FIG. 3 illustrates a preferred first stage 32, it is to be understood that the structure of stages 32, 34, 36 and 38 in the preferred embodiment are substantially identical. A support frame 54 is provided for supporting the conveyor 42 and defining a selected conveyor path. Each cylindrical roller 44 moves in a substantially horizontal path. After the rollers 44 reach the unloading portion 40 (shown in FIG. 1), the conveyor 42 returns on a lower pair of substantially horizontal support rails 56A and 56B supported by a plurality of horizontal cross members 58, which in the preferred embodiment are seven substantially square horizontal cross members formed of square metal tubing.

A novel aspect of a preferred embodiment of the device of the present invention is in the construction of the plurality of rollers 44 comprising the conveyor 42. The rollers 44 are each constructed to engage at least one drive motor 60 or 62 positioned on the first stage 32 (shown in FIG. 1) as the rollers 44 pass through the stage 32. In a like manner, second, third and fourth stages 34, 36 and 38 are each also equipped with a pair of motors. In the preferred embodiment, as the conveyor 42 passes through the first stage, a first set of alternating rollers 44 are mechanically driven by motor 60 in a first rotational direction while a second set of alternating rollers 44 are driven in the opposite rotational direction by the drive motor 62. The rollers defining the first and second sets alternate and together define all of the rollers 44 in the conveyor 42. The drive motors 60 and 62 in the preferred embodiment are variable speed, dual direction motors capable of rotating the rollers 44 at speeds of between about 100 and about 400 rpm.

The drive motors 60 and 62 in the preferred embodiment have output shafts 64 and 66. In the preferred embodiment, timing pulleys 68 and 70 (shown in broken lines) are provided which translate the rotational motion of the motors 60 and 62 to drive first timing belts 71 and 73 which contact drive pulleys 75 and 77 (shown in broken lines). The timing belts 71 and 73 rotate the timing pulleys 75 and 77, each pulley being mounted for rotation on a shaft 79 and 81 (shown in broken lines). Mounted on the shafts 79 and 81 are third driving pulleys 83 and 85 (shown in broken lines) which drive timing belts 72 and 87 in a direction substantially normal to and into the paper. Although the specific configuration of the drives is unimportant to the present invention, the drives according to the preferred embodiment must be capable of moving the pair of timing belts 72 and 87 along a substantially horizontal path for substantially the entire length of the first stage 32 (shown in FIG. 1). As the conveyor 42 passes through the first stage 32, the first set of rollers 44 are rotated in a first rotational direction by motor 60, and the second set of rollers are rotated in an opposite rotational direction by motor 62. The rollers 44 of the first and second sets alternate along the conveyor 42.

Located between motors 60 and 62 and above an upper horizontal portion of the conveyor 42 is an air vent 76 which in the preferred embodiment is disposed along substantially the entire length of the first stage 32 (shown in FIG. 1). In a preferred embodiment of the device of the present invention, one air vent 76 is provided for each stage 32, 34, 36 and 38. Each vent 76 is fixedly mounted onto the support frame 54 such that air flow is directed downwardly onto the upper horizontal portion of the conveyor 42. In the preferred embodiment, air is supplied to each air vent 76 by means of an air blower (not shown). The preferred air pressure delivered to the upper surface of the conveyor 42 is between about 10 and about 100 inches of water pressure.

Figure 4:
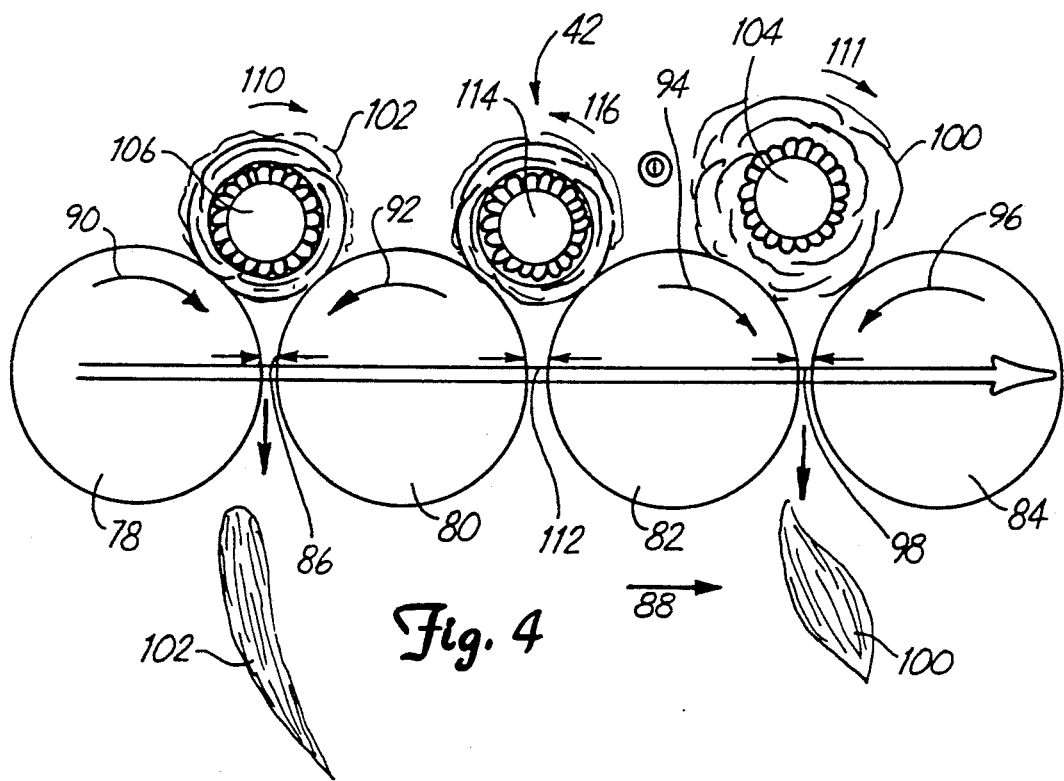
FIG. 4 is a schematic side-elevational view of a portion of a conveyor of the present invention.

The principle of operation of the corn husker of the present invention is illustrated in FIG. 4. FIG. 4 is a schematic side-elevational view of a portion of the conveyor 42 including four adjacent rollers 78, 80, 82 and 84. The spacing defined as the nip 86 between the rollers 78 and 80 and the nip 98 between the rollers 82 and 84 in the preferred embodiment are each between about 0 and about ⅛ of an inch during operation. The rollers 78, 80, 82 and 84 in the preferred embodiment have an outer diameter of about 3-13/16 inch as measured to the outermost edges of the ribbed surfaces of the rollers (shown in FIG. 5). The preferred average rotational speed of the rollers is between about 100 and about 400 rpm with a most preferred rotational speed of about 130 for a 3-13/16 inch diameter roller. The general direction of linear motion of the conveyor is indicated by arrow 88.

According to a preferred embodiment, each roller 78, 80, 82 and 84 rotates in a direction opposite an adjacent roller. Arrows 90, 92, 94 and 96 indicate a preferred direction of rotation of corresponding rollers 78, 80, 82 and 84, respectively. The nip 86 between rollers 78 and 80, as well as the nip 98 between rollers 82 and 84 rotate in a direction which draws the husks 102 and 100 of ears 106 and 104 through the nips 86 and 98 and downwardly into a disposal chute 108 (shown in FIG. 3).

It was discovered that some varieties of corn have husks that wrap over each other in either a generally clockwise or counterclockwise direction depending on which end of the ear is being viewed. For example, an ear 114 is shown in a nip 112 in FIG. 4 having husks which are wrapped in a generally counterclockwise direction. For this reason, it is most preferable to reverse a direction of rotation of rollers 80 and 82 opposite the direction shown by arrows 92 and 94 after ears 104 and 106 are husked, and to select rotational speeds for rollers 80 and 82 which cause roller 80 to move slightly faster than roller 82 and cause the ear 114 to rotate counterclockwise. Counterclockwise rotation of the counterclockwise wrapped husks is believed to more efficiently husk the ear 114 than would clockwise rotation at an identical set of speeds with some varieties of corn.

Known devices which feed ears into husking machines do not currently have the capability of positioning each ear with the butt ends facing in one direction. Also, there are natural variations in the manner in which the husks are wrapped around ears within even a given variety, and there are variations from one variety to another. In order to compensate for differences in the configuration of the husks, a preferred embodiment includes the third stage 36 and the fourth stage 38 (shown in FIG. 1). The third stage 36 functions basically identically to the first stage 32 except that in the first stage, the leading rollers 80 and 84 operate at a slightly faster rate of speed than the trailing rollers 78 and 82, causing the ears 106 and 104 in the operational nips 86 and 98 to rotate clockwise. In contrast, while in the third stage 36, the trailing rollers 78 and 82 are set at a speed slightly greater than the leading rollers 80 and 84 to change the direction of rotation of the ears 106 and 104 and cause the husks to unwind effectively in either the first or third stage. In the second stage 34, the direction of rotation of each roller 78, 80, 82 and 84 is reversed, and the trailing rollers 80 and 84 are rotated at slightly faster speeds than the leading rollers 82. Similarly, in the fourth stage 38, the trailing rollers 80 and 84 are rotated at slower speeds than the leading rollers 82. Even though a majority of husks are removed in the first and second stages 32 and 34 of operation with most corn varieties, the third and fourth stages 36 and 38 are desirable to deliver substantially clean corn ears of substantially all sweet corn varieties with little or no mechanical damage to the kernels. The preferred embodiment would also adequately husk field corn. In the most preferred embodiment, a first set of rollers are selected to travel at rotational speeds which are approximately ten percent higher than the speed of a second set of alternating rollers, each roller in the second set positioned adjacent to a roller in the first set along the conveyor 42. The speed differential in the first stage 32, for example, causes the ears 104 and 106 to rotate in a direction indicated by arrows 111 and 110, respectively.

It is to be understood that while the conveyor 42 is passing through the first stage 32, only every other ear 106 and 104 is husking while the alternating ears 114 merely spin in place (in a direction shown by arrow 116). It is necessary to change the direction of rotation of each of the rollers 78, 80, 82 and 84 when moving from the first stage 32 to the second stage 34 such that ears 104 and 106 spin in place while the husks of the ear 114 are removed.

The relative upward motion of rollers 80 and 82 in the first stage of operation against the husks of the ear 114 are not believed to cause any significant husking action. Therefore, it is necessary for each roller to move into the second stage 34 (shown in FIG. 1) for the purpose of reversing the directions of rotation of rollers 78, 80, 82 and 84. Although the physical structure of the second stage in the preferred embodiment is substantially identical to what is described above, the direction of rotation of the motors is reversed such that the ear 114 is husked while the ears 106 and 104 merely spin.

It was discovered that the operation of the present device can be greatly enhanced by applying air pressure in a direction substantially normal to an upper plane of travel of the conveyor 42. The air vent 76 (shown in FIG. 3) was found to greatly enhance the husking operation by helping to force the loosened husks through the nips 86, 112 and 98. The air vent 76 is capable of directing a stream of air downwardly onto the husks as the husks are being mechanically pulled from the ears. Each of the rollers 44 in the conveyor 42 in the preferred embodiment have ribbed surfaces 118 (shown in FIG. 5) which allow greater downward air movement to help push the loosened husks and silks from the conveyor 42 and into a waste chute 108 (shown in FIG. 3).

FIG. 5 is an enlarged partial cross-sectional view taken longitudinally through a roller 44 of the device of the present invention. Each roller 44 is mounted onto a central shaft 119 which is supported proximate both ends 120 and 122 by a pair of chains 124 and 126. In the preferred embodiment, the chains 124 and 126 are drive chains of the type driven by rotating sprockets for supporting a roller having a 3-3/16 inch outer diameter. The most preferred chain has about a 2 inch pitch. The chains 124 and 126 in a preferred embodiment move substantially continuously along a closed path during the husking process.

Each shaft 119 is pivotally mounted at each end to the chains 124 and 126. Although the present invention employs the use of chains 124 and 126, it is to be understood that the endless moving members of the present device can be formed of belts or other structures capable of moving a plurality of rollers 44 along a defined path. It would also be possible to use a belt wide enough such that only one endless moving member is sufficient to support the rollers 44. The rollers 44 in the preferred embodiment are closely spaced to form a nip 127 (identical to nips 86 and 98 shown in FIG. 4) for receiving a cut ear of corn 106 (shown in FIG. 4).

The outer surfaces of the roller 44 in the preferred embodiment are covered with a layer of ribbed elastomeric material defining a ribbed surface 118 which in the preferred embodiment is formed from a sheet of Neoprene rubber having a shore A hardness of about 60 durometers. It is also desirable to select materials to form the roller 44 such that the mass moment of inertia is minimized, as during each rotation of the conveyor 42 through the defined path, the direction of rotation of each roller 44 changes at least one time and preferably at least three times.

Each roller 44 has a cylindrical wall 128 which in the preferred embodiment is formed of a lightweight material such as rolled aluminum sheet stock. Each roller 44 has a first idler bearing hub 130 at one end and is preferably formed of food grade Delrin ™, an acetal resin available from the E.I. du Pont de Nemours & Co. of Wilmington, Del. The hub 130 has a through bore 132 for receiving the shaft 119. The through bore 132 is large enough for the shaft 119 to rotate freely. In the preferred embodiment, a sleeve bearing 133 is provided in the through bore 132 for providing smooth rotational movement between the hub 130 and the shaft 119. The hub 130 in a preferred embodiment is locked onto the cylindrical wall 128 by means of a plurality of keys 136. At the end opposite the hub 130 end is a hub 134 which in the preferred embodiment is formed of stainless steel. The hub 134 has a through bore 138 for receiving a pair of spaced apart sleeve bearings 140 and 142 for contacting a surface of the shaft 119.

The shaft 119 in the preferred embodiment is formed of stainless steel and is substantially solid. At each end of the shaft 119 is a tap 144 and a counter bore 146 for providing a means of pivotal attachment to the chains 124 and 126. Also mounted onto the shaft 119 are sleeves 148 and 150 which provide a means of retaining the rollers 44 between a pair of upper support rails 152A and 152B and lower support rails 154A and 154B (shown in FIG. 3). The sleeve 150 has a through bore (not shown) of a size and shape for receiving a sleeve bearing (not shown) proximate an end opposite the idler bearing hub 130. The sleeve bearing (not shown) is provided along with the hub bearing 133 to allow the shaft 119 to freely rotate. In a preferred embodiment, the sleeves 148 and 150 are formed from Delrin TM.

Mounted near one end of the shaft 119 is a timing pulley 156 of known two piece construction which assists in driving the roller 44 in the selected direction of rotation. The outer surfaces of the timing pulley 156 engage the timing belt 72 which in the preferred embodiment is driven by the first motor 60 (shown in FIG. 3) along a closed path extending along the length of the first stage 32. As described above, only every other roller 44 is driven from a first side 158 of the conveyor 42. The motor 60 in the preferred embodiment (shown in FIG. 3) drives a first set of rollers 44, the set including every roller having a timing pulley 156 mounted on a first side 158 of the continuous chains 124 and 126. The motor 60 moves the timing belt 72 in a selected direction while at the same time the motor 62 (also shown in FIG. 3) engages each timing pulley 160 in a second set located on a second side 159, each roller in the second set alternating with each roller in the first set. The second timing belt 87 drives the pulley 160 in a direction opposite the direction of travel of the first pulley 156.

In the preferred embodiment, the conveyor 42 moves in a direction indicated by arrow 46 (shown in FIG. 1) while the motors 60 and 62 remain stationary. As the timing pulleys 156 and 160 approach the timing belts 72 and 87 respectively, the timing pulleys 156 and 160 engage the timing belts 72 and 87 as the conveyor 42 moves through the first stage 32.

It was discovered that by selecting the nip 127 having a width of less than or equal to about ⅛ of an inch measured from the outer edges of the ribs, it is possible to draw the husks downwardly through adjacent rollers without causing substantial damage to the kernels. In order to precisely control the width of the nip 127, the present device includes means 23 (shown in FIG. 11) for shortening the length of the chains 124 and 126 to effectively reduce the distance between the outer surfaces of adjacent rollers 44.

FIG. 6 is a schematic side-elevational view of the conveyor 42 of a preferred embodiment of the device of the present invention in the relaxed position. The conveyor 42 includes a plurality of rollers 44 rotatably mounted to the chain 124 (shown in detail in FIG. 7). In the relaxed position, adjacent rollers 44 at the nips 86, 112 and 98 are spaced approximately 3/16 of an inch apart or greater. The chain 124 comprises a plurality of individual links 164 which in the preferred embodiment are two inches in length on center. As mentioned previously, the most preferred roller 44 diameter is 3-13/16 inches. The nip 86, 112 and 98 width between adjacent rollers 44 is about 3/16 of an inch in the relaxed position as shown in FIG. 6.

Pivotally attached to the chain 124 between rollers 44 are guide rollers 166A and 168A. A greatly expanded top-plan view of the chain 124, rollers 44, and pairs of guide rollers 166A, 166B and 168A, 168B are shown in FIG. 7.

The guide rollers 166A, 166B, 168A and 168B in the preferred embodiment are formed of Delrin TM. Each Delrin TM guide roller 166A, 166B, 168A and 168B has a hub 172A, 172B, 170A and 170B on one end, the hub formed integrally with the guide roller in the preferred embodiment and having a through bore (not shown) for receiving a connecting pin 176 and 174 adapted for pivotally connecting the links 164 of the chain 124. Alternating guide rollers are mounted hub side out so that a first set of alternating closely spaced hubs 168A and 168B ride on a narrow rail defined by the reference lines 178A and 178B while the remaining guide rollers ride on a wider rail defined by reference lines 180A and 180B. By adjusting the vertical position of a surface containing the reference lines 178A, 178B, 180A and 180B, it is possible to effectively shorten the length of the chain 124 to the desired length and adjust the nip width between adjacent rollers 44.

FIG. 8 is a schematic side-elevational view of a conveyor of a preferred embodiment of the device of the present invention in a first contracted position. In this embodiment, the narrowly spaced guide rollers 168 and 182 have pivotal axes 184 and 186 which remain in substantially the same horizontal plane as the rotational axes of the rollers 44. However, the spaced apart guide rollers 166 and 188 are raised to effectively shorten the length of the chain 124. In this embodiment, only the rollers 44 which have motion in the direction illustrated by arrows 190 and 192 move closer together into a position sufficient to husk the corn. The nips 86 and 98 therefore between such rollers are closely spaced, while the alternating nips 112 and remain separated. It is to be understood that FIGS. 6, 8, 9 and 10 are greatly exaggerated in that the nip width prior to shortening in the preferred embodiment is about a 3/16 of an inch (when the chain is new), and between about 0 and about ⅛ of an inch when the chain is shortened. It is also to be understood that the chain will stretch over its useful life and therefore the nip between rollers 44, when the chain is in the relaxed position as shown in FIG. 6 will increase over the life of the chain. The method described above and illustrated in FIG. 8 is used to shorten the chain in the first stage 32 and the third stage 36 (shown in FIG. 1) in the preferred embodiment.

FIG. 9 shows another preferred method of shortening the chain 124 of a preferred embodiment of the present invention. The closely spaced guide rollers 168 and 182 are pushed downwardly while the rotational axes of the spaced apart guide rollers 166 and 188 remain substantially in line with the rotational axes of the rollers 44. The method illustrated in FIG. 9 is used to shorten the chain in the second stage 34 and the fourth stage 38 (shown in FIG. 1) in the preferred embodiment.

FIG. 10 shows yet another preferred method of shortening the chain 124 comprising the combination of raising the spaced apart guide rollers 166 and 188 and at the same time urging downward the closely spaced guide rollers 168 and 182. Although the combination of raising and lowering the guide rollers shortens the chain 124, this method is less desirable because it restricts air flow and it is more difficult to clear debris from the conveyor 42.

Figure 11:
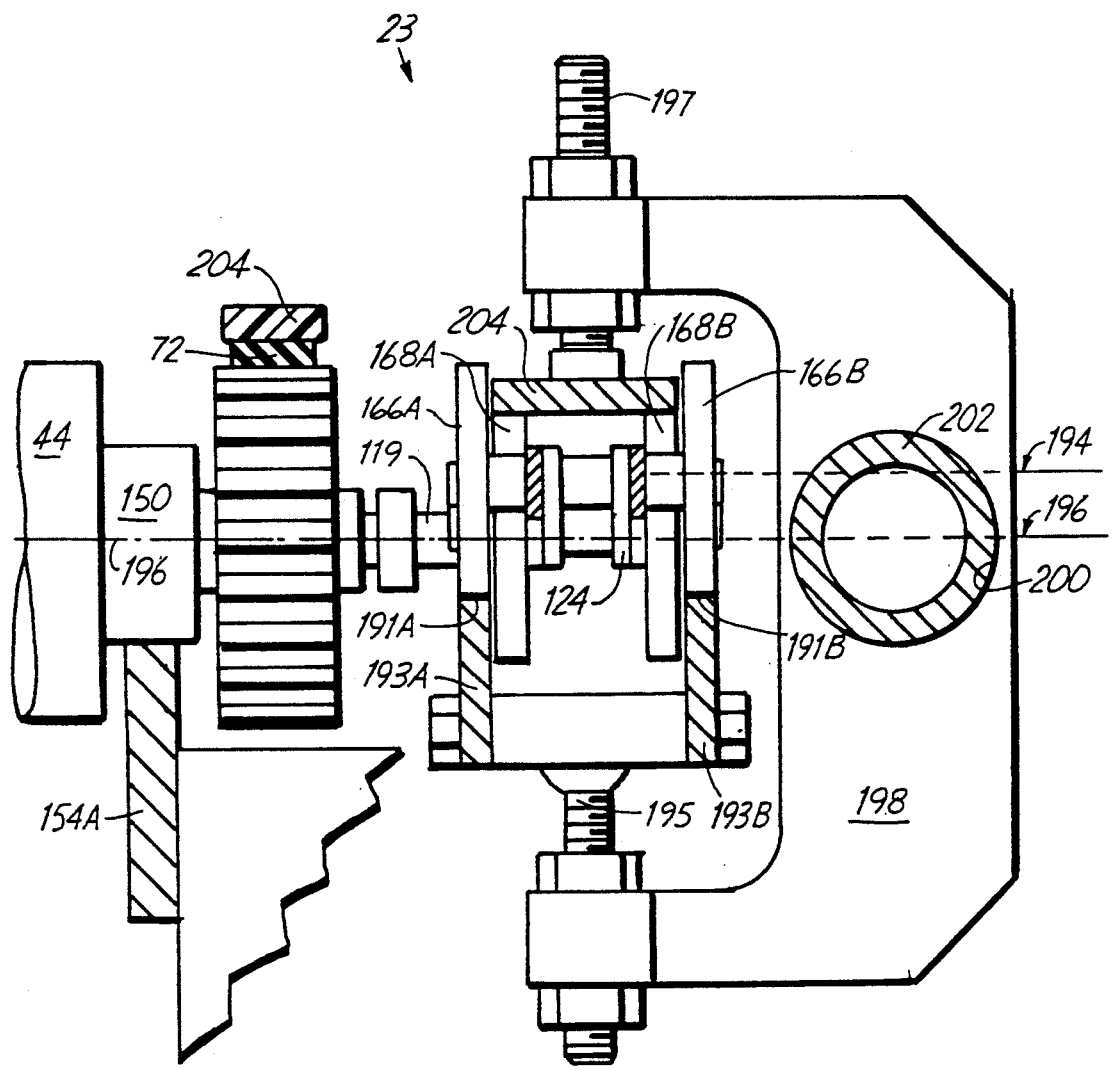
FIG. 11 is an expanded cross-sectional view of a preferred means of shortening the chain of a preferred embodiment of the present invention.

The most preferred device for moving the guide rollers to shorten the chain 124 is illustrated in detail in FIG. 11.

FIG. 11 is an expanded cross-sectional view of a device for shortening the chain 124 of the present invention. Although the illustrated means for shortening the chain shows a device which shortens only one chain, it is to be understood that a substantially identical device is provided for shortening the corresponding chain on the opposite side of the conveyor 42. A pair of lower surfaces 191A and 191B of a pair of spaced apart guide rollers 166A and 166B ride along a pair of lower rails 193A and 193B having an upper surface defining the reference lines 180A and 180B (shown in FIG. 7) which in the preferred embodiment are formed into a substantially U-shaped trough member which serves to raise a pivotal axis 194 of the guide rollers 166A and 166B vertically above an axis of rotation 196 of the shaft 119. Depending upon the vertical height of the rails 193A and 193B, the rails may raise the axis 194 or maintain the axis at a vertical height of an axis of rotation 196 of the roller 44. Rails 193A and 193B defining the U-shaped trough are supported by a C-support 198. In the preferred embodiment, a threaded bolt 195 is provided to adjust the height of the rails 193A and 193B. The C-support 198 has an aperture 200 extending therethrough. Mounted horizontally through the aperture 200 is a length of stainless steel tubing 202 which is fixedly attached to the stationary frame 54 (shown in FIG. 3). Although the number of C-supports 198 and the spacing of the supports is not critical to the present invention, in the preferred embodiment, each side of each stage has two C-supports 198 proximate each end. The upper surface of the U-shaped rail 193A and 193B in the preferred embodiment is substantially horizontal. When the rollers 166A and 166B contact an incline ramp located on an upper surface of the rail, the chain is shortened in a desired manner (as shown in FIGS. 8, 9 and 10).

Positioned above the closely spaced guide rollers 168A and 168B is a substantially horizontal rail 204 which extends substantially along the entire length of each side of each stage. When the closely spaced guide rollers 168A and 168B come into contact with the downwardly ramped lower surface of an end of rail 204, closely spaced guide rollers 168A and 168B are moved into the desired position as illustrated in FIGS. 8, 9 and 10. In the preferred embodiment, a threaded bolt 197 is provided to adjust the vertical height of the rail 204. The reference lines 178A and 178B (shown in FIG. 7) are contained in a lower surface of the rail 204. The rollers 168A and 168B are pushed downwardly in the second and the fourth stages in the preferred embodiment such that the pivotal axis (not shown) of the guide rollers 168A and 168B are forced vertically below the central axis 196 of the shaft 119.

The combination of pressing the guide rollers 168A and 168B against the rail 204 and pressing rollers 166A and 166B against U-shaped rails 193A and 193B in the less preferred embodiment shown in FIG. 10 tightens the chain by forming a zigzag type configuration in portions of the chain. If both types of shortening methods are applied as illustrated in FIG. 10, the nip between every roller 44 is reduced. Reducing the nip between adjacent rollers which are not rotating in a direction which husks the corn has certain disadvantages. By reducing the nip where the reduction is not needed, the effective downward air flow which aids in pushing loosened husks and silks off the conveyor 42 is reduced. It is more preferable to leave the nip spacing further apart (illustrated in FIGS. 8 and 9) to more efficiently remove husks and silks from the conveyor 42.

The weight of the rollers 44, the downward force of the rail 204 which contacts a timing belt 206 and the presence of a substantially horizontal rail 154A (shown in FIG. 3) which contacts the sleeve 150 maintains the central axis 196 of the shaft 119 at substantially the same vertical height when the conveyor 42 is traveling along the upper horizontal portion of the husker 20. Although only one rail 154A is shown in FIG. 11, it is to be understood that an adjacent rail 154B and a corresponding pair of upper rails 152A and 152B (shown in FIG. 3) are disposed above the sleeves 148 and 150 on both sides of the conveyor 42.

Figure 12:
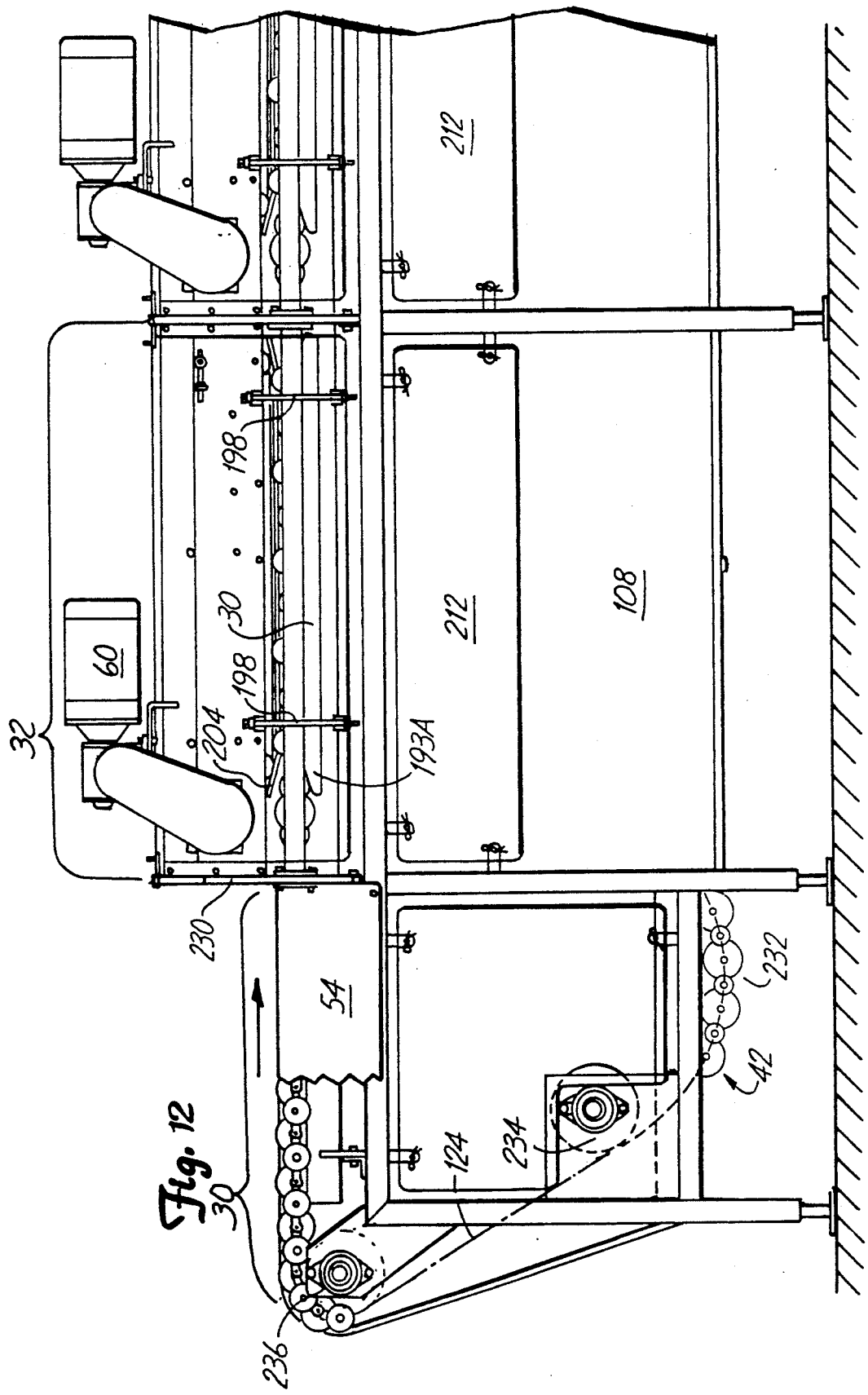
FIG. 12 is a partial side-elevational view of a preferred embodiment of the present invention, showing the loading portion.

FIG. 12 is a partial side-elevational view of a preferred embodiment of the present invention showing the loading portion 30. As mentioned above, each side of each stage, for example the first stage 32 in the preferred embodiment, has a pair of spaced apart C-supports 198 for supporting the means for tightening the chains 124 and 126 (shown in FIG. 5) and for controlling the width of the nip between the rollers. The upper rail 204 has downwardly ramped leading ends for receiving the rollers 168A and 168B (shown in FIG. 11). The lower guide rails 193A and 193B (shown in FIG. 11) have upwardly ramped leading and trailing edges for urging the rollers 166A and 166B onto and off of an upper surface of rails 193A and 193B (shown in FIG. 11). Each drive motor 60 is mounted on the stationary frame 54 in the preferred embodiment.

A chute 108 is provided on a side of the husker 20. Opposite the chute side 108 (shown in FIG. 3) are protective covers 212. The waste chute 108 extends throughout all four stages 32, 34, 36 and 38 in the preferred embodiment of the device.

Figure 13:
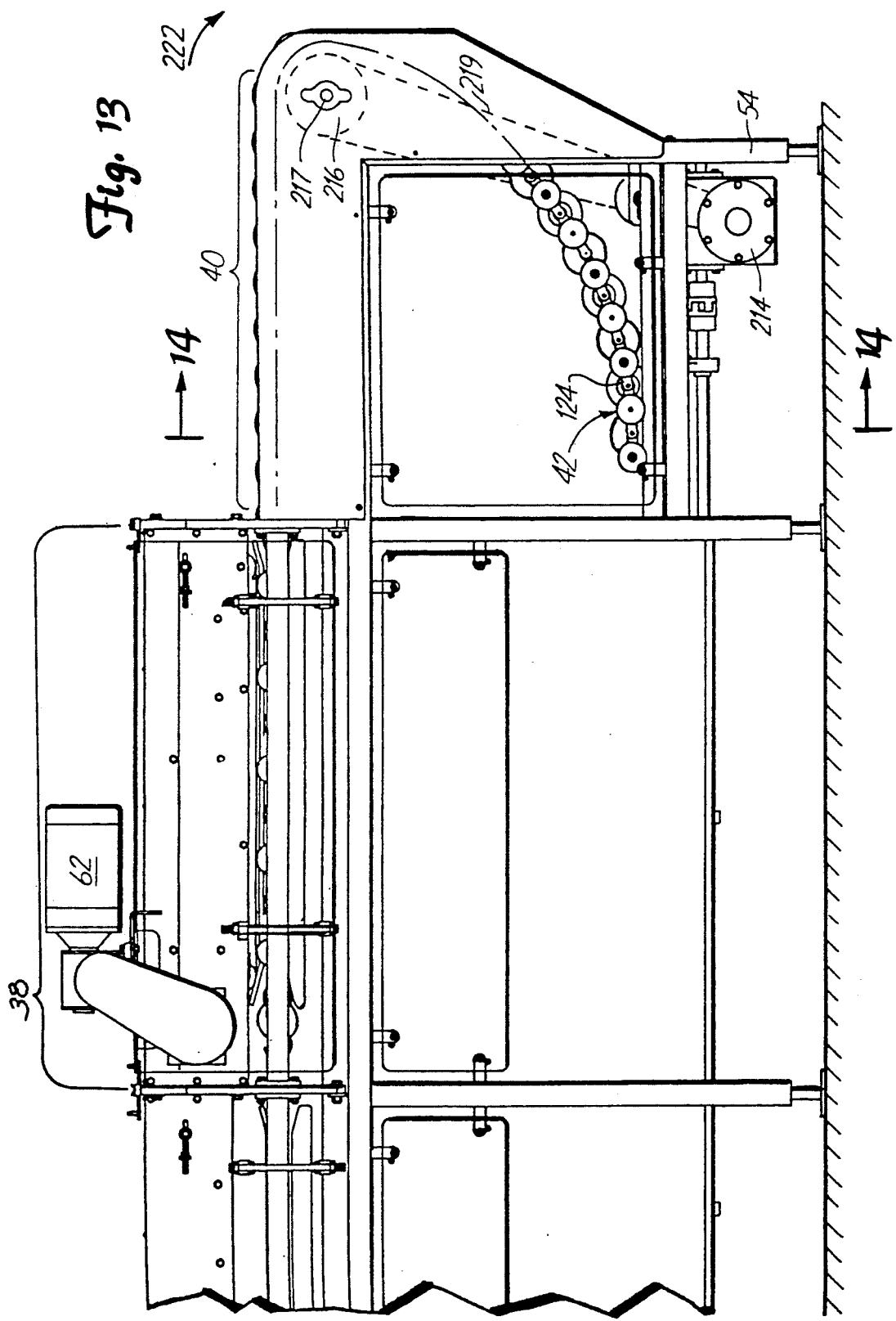
FIG. 13 is a partial side-elevational view of a preferred embodiment of the present invention, showing the unloading portion.

FIG. 13 is a partial side-elevational view of a preferred embodiment of the present invention, showing the unloading portion 40. In a preferred embodiment, both chains 124 and 126 (shown in FIG. 3) are driven by a single drive motor 214 mounted on the support frame 54 at a point proximate the discharge end. The most preferred drive motor is a variable speed motor and is capable of driving the conveyor 42 at a linear speed of between about 33 and about 133 feet per minute. This linear speed translates to a husking capacity of between about 100 to about 400 ears per minute.

The conveyor 42 of the present invention may be driven by any known means.

The drive motor 214 in the preferred embodiment has a motor shaft (not shown). Mounted onto the motor shaft (not shown) is a first drive sprocket (not shown) which in the preferred embodiment drives an idler sprocket 216 by means of a chain 219. The idler sprocket 216 is mounted onto a rotationally mounted drive shaft 217.

Figure 14:
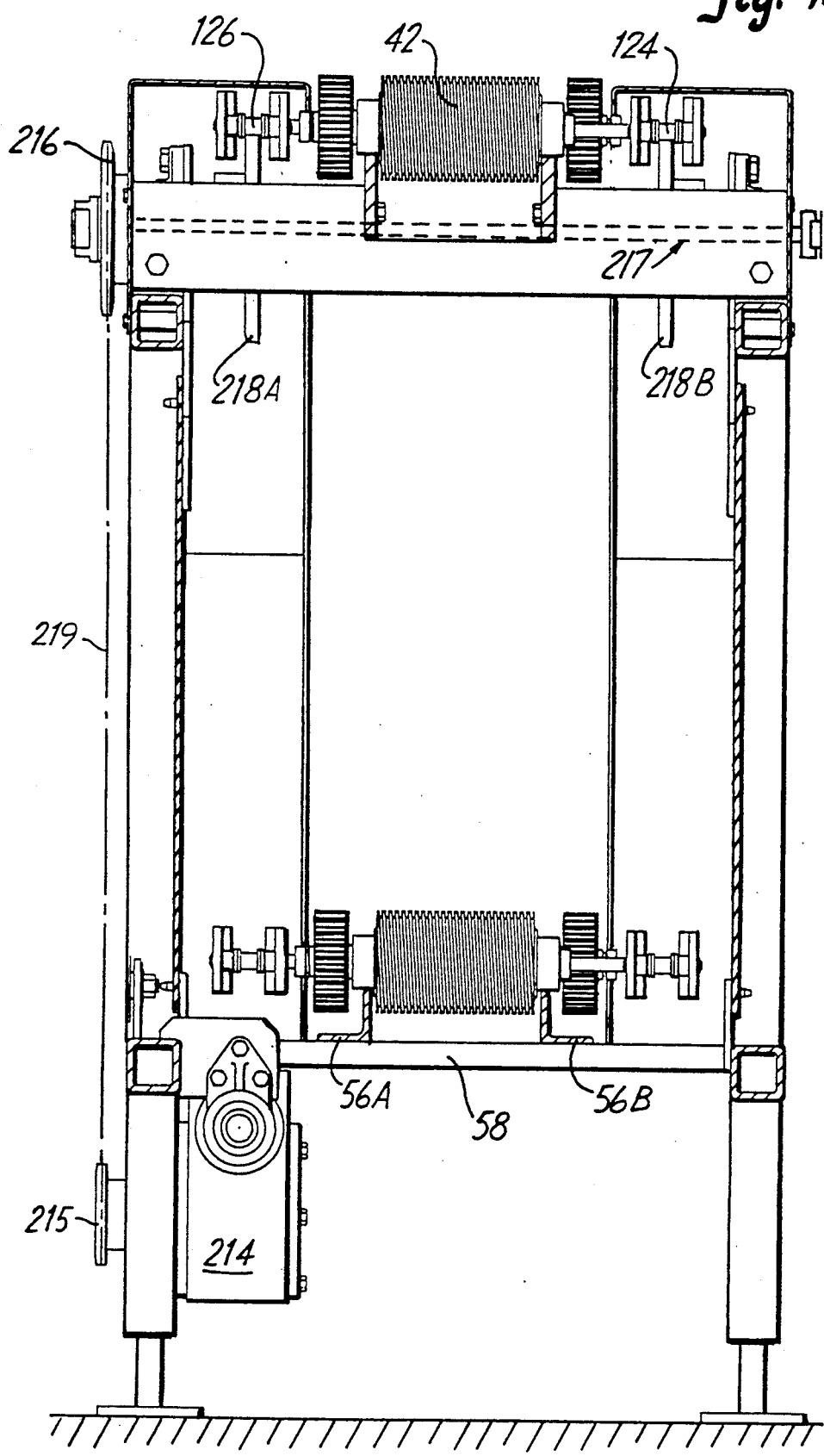
FIG. 14 is a cross-sectional view of the unloading portion of a preferred device of the present invention, taken along line 14—14 as shown in FIG. 13.

FIG. 14 is a cross-sectional view of the unloading portion 40 of a preferred device of the present invention, taken along line 14—14 as shown in FIG. 13. In the preferred embodiment, a pair of drive sprockets 218A and 218B are mounted onto the shaft 217 and are spaced from the ends of the drive shaft 217 for engaging and driving the chains 124 and 126 of the conveyor 42. According to the most preferred method of driving the chains 124 and 126, a single drive motor 214 assures that both chains 124 and 126 move at substantially the same speed.

FIG. 14 also illustrates the construction of the lower portion of the conveyor 42. Lower support rails 56A and 56B in the preferred embodiment are provided for supporting the rollers 42 and are supported by a plurality of horizontal members 58. The members 58 serve the function of supporting and reducing tension on the conveyor 42.

Referring back to FIG. 12, proximate a first end 230 of the first stage 32, the lower rails 56A and 56B are discontinued to provide an area where the chain sags as shown generally at 232. This sagging motion creates sufficient tension in the conveyor 42 such that the chain 124 engages the idler sprockets 234 and 236 (shown in broken lines). The sprockets 234 and 236 are mounted in a known manner to the support frame 54. Although only the sprockets of a first side of the loading end 30 of conveyor 20 are illustrated in FIGS. 12 and 13, it is to be understood that substantially identical sprockets are located on the opposite side of the loading end 30 of the conveyor and that both chains are driven in substantially the identical manner. Although the drive system of this preferred embodiment employs the use of only one drive motor and a plurality of drive sprockets, the present invention is not limited by a specific drive configuration and many other drive configurations would be suitable. For example, the present invention contemplates the use of a second drive motor at the feed end as well as the first drive motor for pushing the conveyor 42 through the husker 20.

FIG. 15 is a diagrammatical top-plan view of a conveyor 42 of the preferred embodiment of the present invention. The first drive motor 60 drives alternating rollers 235, 237, 242, 246 and 250 from a first side 251 by contacting the first timing belt 72 (shown schematically) to the corresponding timing pulleys 252, 254, 256, 258 and 260. The second motor 62 (shown in FIG. 3) drives the second timing belt 87 (shown schematically) located on the second side 270 which contacts timing pulleys 262, 264, 266 and 268. In the preferred embodiment, the timing belts 72 and 87 are double sided as shown in FIG. 16.

FIG. 16 is a diagrammatical side-elevational view of the conveyor of a preferred embodiment of the present invention. As the main drive motor 214 (shown schematically) begins to pull the conveyor 42 through the first stage 32, the timing belt 87 engages each of the timing pulleys 262, 264, 266 and 268 passing through the first stage, causing the corresponding rollers 239, 240, 244 and 248 to rotate in a first direction as the entire conveyor 42 moves generally in the direction indicated by arrow 272. The drive motor 62 (shown in FIG. 3) drives the pulley 274 which in the preferred embodiment is located above the timing pulleys 262, 264, 266 and 268. For this reason, the preferred invention utilizes a double sided timing belt 87. The present invention also contemplates driving the timing belt 87 by alternate means such that a double sided timing belt 87 is not required. A preferred embodiment also includes the upper rail 204 and timing pulley (not shown) which applies a downward pressure on the timing belt 87 such that the timing belt remains in frictional contact with the corresponding timing pulleys. The opposite side is driven in a like manner except that pulleys 252, 254, 256, 258 and 260 are driven in a direction opposite that of the rollers driven on the side 270.

Although the present invention utilizes 3-13/16 inch diameter rollers 44 which travel at a most preferred rotational speed of approximately 127 revolutions per minute plus or minus 10 percent, it is to be understood that other diameter rollers could be used. For example, a three inch roller would be suitable to perform the same function except that the speed of the drive rollers would have to be increased to a preferred speed of about 170 revolutions per minute to husk in the same amount of time. Similarly, a two inch roller could be used, but the corresponding average rotational speed would have to be increased to a preferred speed of about 254 revolutions per minute. The optimum diameter of the rollers 44 is suggested by ear dimensions and variety. Sweet corn is usually between 2 and 4 inches in diameter before husking. With changes in roller 44 diameter it would also be desirable to select different chain link lengths to maintain the desired spacing of about 3/16 inch at the nip while the chain is in the relaxed position, and between about zero and about $\frac{1}{8}$ inch when the chain is tightened. Although the size of the drive and idler sprockets is unimportant to the present invention, it is also necessary to select a sprocket large enough so that when the conveyor travels over the sprocket, the rollers 44 do not come into close contact.

Figure 18:
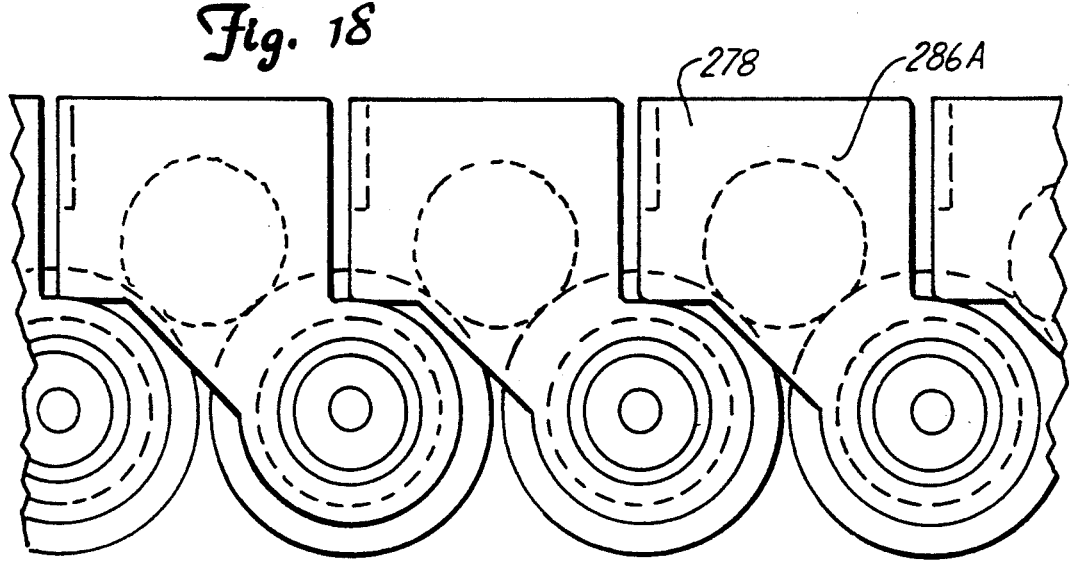
FIG. 18 is a side-elevational view of the conveyor illustrating the mounted enclosures of a preferred embodiment of the present invention.
Figure 17:
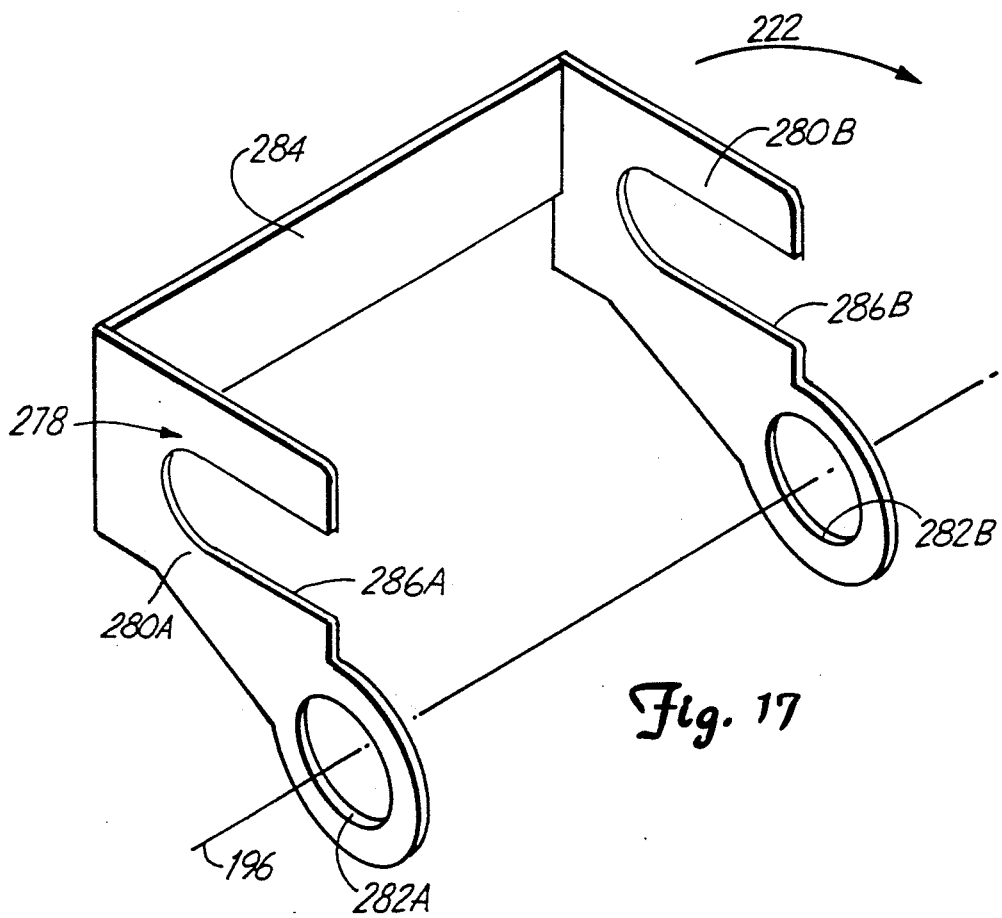
FIG. 17 is a perspective view of an enclosure for mounting on a roller of the present invention.

FIG. 17 illustrates another aspect of a preferred embodiment of the device of the present invention. FIG. 17 is a perspective view of an enclosure for mounting onto the sleeves 148 and 150 of a roller 44 of the present invention (shown in FIG. 5). A plurality of rotatably mounted enclosures 278 are provided for preventing ears from hopping over the rollers 44 when the husker is in operation. Each enclosure 278 comprises a pair of substantially identical side members 280A and 280B which in the preferred embodiment are constructed of stainless steel sheet material. Each side member 280A and 280B has an opening 282A and 282B for receiving an outer surface of the sleeves 148 and 150 (shown in FIG. 5). Each enclosure 278 also includes a connecting member 284 which in the preferred embodiment is positioned at substantially right angles to the side members 280A and 280B. In the preferred embodiment, member 284 is also constructed of stainless steel sheet material. In the preferred embodiment, slots 286A and 286B are provided for allowing the air nozzles 28A through 28H (shown in FIG. 1) to deliver air bursts to the ear. In operation, the enclosures 278 remain in the position shown in FIG. 18 and prevent the ears 194 from hopping from one nip to another. At the exit end of the conveyor as shown in FIG. 13, the enclosures 278 rotate along axis 196 and flip forward (not shown) as indicated by arrow 222, releasing the ears 286.

Referring back to FIG. 1, in the preferred embodiment, the husker 20 includes a program logic controller (not shown). The controller in the preferred embodiment controls the duration of each air pulse from the nozzles 28A, 28B, 28C, 28D, 28E, 28F, 28G and 28H, the frequency of the air pulses, and the speed of each of the motors 60 and 62 on each of the stages 32, 34, 36 and 38. The controller also controls the speed of the drive motor 214 (shown in FIG. 13). In the preferred embodiment, a Texas Instruments model 530C program logic controller is used to control the husker 20. Texas Instruments is located in Hunt Valley, Md.

The method of the present invention includes the steps of cutting off at least the butt end of each ear of corn, positioning the ear in a nip between a pair of adjacent cylindrical rollers, the rollers being closely spaced together, an area between adjacent rollers defining the nip. In a preferred embodiment, the rollers 44 as shown in FIG. 5 are coated with a layer of elastomeric material 288 such as 60 durometer Shore A hardness Neoprene rubber. A plurality of ribs 118 are provided for increasing the ability of the rollers to grip the husks. The ribs 118 are also believed to aid in maintaining a downward flow of air through the nip between each adjacent roller.

The most preferred cutting method includes forming two cuts near each end of the ear in a plane located substantially normal to a cylindrical axis of the ear. After husking, the ears may be cut in a like manner into smaller sections. The adjacent rollers according to the present method are adapted for rotational movement in opposite directions. The rollers are rotated at rotational speeds and directions sufficient to remove substantially all of the husks, while preventing substantial kernel damage. The method of the present invention also includes rotating adjacent rollers at unequal speeds, the speed selected to cause the ear to rotate along a cylindrical axis of the ear during husking. It is believed that the rotation of the ears is necessary for efficient husking. According to the most preferred method, an adjacent roller rotates at a speed between about 5 and about 15 percent different than the adjacent roller, with the preferred speed differential being about 10 percent. The device of the present invention is a preferred device to practice the present method.

According to a preferred method, the step of rotating each adjacent cylindrical roller includes selecting a first pair of rotational speeds for causing the ears to rotate in a first direction and then rotating the rollers at the first selected pair of rotational speeds. The step of rotating each adjacent cylindrical member also includes the step of selecting a second pair of rotational speeds for causing the ears to rotate in the opposite direction and then rotating the rollers at the second selected pair of rotational speeds. It is to be understood that the direction of rotation according to the most preferred embodiment of the second pair of rotational speeds is the same as the first pair. The speed of a first of a pair of rollers is slightly faster than the speed of second roller during the first rotational sequence, and the speed of the second roller is slightly faster than the speed of the first roller in the second rotational sequence.

Husked corn ears formed according to the present method may optionally be blanched after husking and or packaged. Husked ears formed according to the present method may also be frozen after blanching and before packaging or frozen after packaging or both.

The present invention also includes a frozen food product formed according to the method of the present invention.

The relative speed of the adjacent rollers and the distance of the nip is selected to gently and effectively remove the husks and silks from the cut ear of corn. It was discovered that the required rotational speeds and nip setting depends upon the variety of corn and can easily be determined through a minimal amount of experimentation. Optionally, air pressure may be applied in a continuous stream or pulsed in a direction substantially along a central cylindrical axis of the ear toward the cut ends prior to each rotational sequence to expand and loosen at least a portion of the husks from the ear. The most preferred method includes using pulsing air at a gauge pressure of between about 20 and about 100 psig to generate pulsing speeds of between about 0.1 to 0.2 seconds per ear. Also, air flow pressure may optionally be applied in a direction substantially normal to a plane containing two rotational axes of adjacent rollers for helping push the husks and silks through the nip, such that the waste materials can be removed.

Although the present invention has been described with reference to preferred embodiments, workers skilled in the art will recognize that changes may be made in form and detail without departing from the spirit and scope of the invention.

What is claimed is:

1. A method of removing the husks from an ear of corn while preventing substantial damage to the kernels, the husks being attached to the ear at a butt end, the method comprising:
    cutting off at least the butt end of the ear;
    positioning the ear between at least one pair of adjacent cylindrical rollers, the rollers being closely spaced, an area between the rollers defining a nip, the adjacent rollers adapted for rotational movement in opposite directions;
    selecting a first set of rotational speeds and directions for the pair of adjacent cylindrical rollers to cause an ear positioned in the nip to rotate in a first rotational direction;
    selecting a second set of rotational speeds and directions for the same pair of adjacent cylindrical rollers to cause the ear to rotate in a direction opposite the first rotational direction; whereby the adjacent cylindrical rollers are operated at rotational speeds, in directions and for a time sufficient to remove substantially all of the husks, while preventing substantial damage to the kernels.

2. The method of claim 1 wherein a first adjacent cylindrical roller in the pair rotates at a speed exceeding the speed of the other roller, causing the ear to rotate in a first direction along a cylindrical axis of the ear during husking.

3. The method of claim 2 wherein said first adjacent roller rotates at a speed between about 5 and about 15 percent faster than the speed of the other adjacent roller.

4. The method of claim 1 wherein the rotating step comprises selecting a first pair of rotational speeds for rotating the ear in a first direction, and rotating the rollers at the first pair of rotational speeds, and further comprising the step of selecting a second pair of rotational speeds to rotate the ear in the opposite direction, and then rotating the rollers at the second pair of rotational speeds.

5. The method of claim 1 wherein the adjacent cylindrical rollers each have a rotational axis which lies on a plane, and further comprising the step of applying air pressure in a direction normal to the plane and into the nip, at a pressure and volume sufficient to aid in pushing the loosened husks through the nip.

6. The method of claim 1 and further comprising the step of expanding and loosening at least a portion of the husks from the ear by means of delivering a stream of compressed air in a direction along a central cylindrical axis of the ear proximate a central cylindrical axis of the ear prior to the step of rotating the adjacent rollers.

7. The method of claim 6 wherein the stream of air is delivered by means of a pulsing flow.

8. The method of claim 1 wherein the butt end of the ear and the end opposite the butt end are cut along a plane substantially normal to a central cylindrical axis of the ear prior to expanding and loosening the husks from the ear.

9. The method of claim 1 and further comprising the step of cutting the husked ears along a plane substantially normal to a central cylindrical axis of the ear, forming smaller ears after the step of rotating each cylindrical roller.

10. The method of claim 1 and further comprising the step of blanching the husked ears.

11. The method of claim 1 and further comprising packaging the husked ears.

12. The method of claim 10 and further comprising the step of freezing the husked ears after blanching.

13. The method of claim 12 and further comprising the step of packaging the husked ears.

14. The method of claim 1 wherein the rollers are covered with an elastomeric material.

15. The method of claim 14 wherein the rollers are covered with an elastomeric material having a ribbed surface.

16. A frozen food product prepared by a process comprising:
cutting off at least the butt end of the ear;
positioning the ear between at least one pair of adjacent cylindrical rollers, the rollers being closely spaced, an area between the rollers defining a nip, the adjacent rollers adapted for rotational movement in opposite directions;
selecting a first set of rotational speeds and directions for the pair of adjacent cylindrical rollers to cause an ear positioned in the nip to rotate in a first rotational direction;
selecting a second set of rotational speeds and directions for the same pair of adjacent cylindrical rollers to cause the ear to rotate in a direction opposite the first rotational direction; whereby the adjacent cylindrical rollers are operated at rotational speeds, in directions and for a time sufficient to remove substantially all of the husks, while preventing substantial damage to the kernels.

17. A device for removing the husks from an ear of corn while preventing substantial kernel damage, comprising:
a support frame;
a conveyor capable of traveling along a defined closed path comprising at least one endless moving member, a plurality of spaced apart substantially cylindrical rollers mounted for rotation on the endless moving member, wherein an axis of rotation of the cylindrical rollers is positioned transverse to a direction of travel of the conveyor;
first driving means attached to the support frame for driving the conveyor along a defined path substantially within the support frame;
second driving means attached to the support frame for driving a first set of rollers in a first direction at a first speed, and for driving a second set of rollers in an opposite direction at a second speed, the first set of rollers alternating with the second set along the conveyor; and
third driving means attached to the support frame for driving said first set of rollers in a second direction at a third speed, and for driving said second set of rollers in a first direction at a fourth speed.

18. The device of claim 17 wherein the conveyor comprises a pair of spaced apart endless moving members.

19. The device of claim 18 wherein the spaced apart endless moving members comprise first and second chains.

20. The device of claim 19 wherein each cylindrical roller is mounted for rotation on a shaft, the shaft being pivotally connected proximate a first end to the first chain, and a second end being pivotally connected proximate a second end to a second chain.

21. The device of claim 18 wherein means are provided for shortening a length of each endless moving member for causing a distance between selected adjacent cylindrical rollers to be no greater than about ⅛ inch apart.

22. The device of claim 18 wherein the means for shortening the length of each endless moving member comprises a plurality of pairs of guide rollers, each pair being mounted for rotation on one endless moving member and being positioned on opposite sides of said endless moving member.

23. The device of claim 22 wherein the plurality of pairs of guide rollers comprise a first group of pairs, each pair of the first group having first and second outer substantially cylindrical contact surfaces, and a first spacing between the first and second outer substantially cylindrical contact surfaces, wherein the plurality of guide rollers further comprise a second group of pairs, each pair of the second group having third and fourth outer substantially cylindrical contact surfaces, and a second spacing between the third and fourth outer substantially cylindrical contact surfaces, the first and second spacings being unequal.

24. The device of claim 23 wherein a first support rail is provided to contact the outer substantially cylindrical contact surfaces of the first group of pairs of guide rollers, and a second support rail is provided to contact the outer substantially cylindrical contact surfaces of the second group of pairs of guide rollers.

25. The device of claim 24 wherein the first support rail is located above the second support rail, and the first group of pairs of guide rollers and the second group of pairs of guide rollers each pass substantially horizontally between the first and second support rails.

26. The device of claim 17 wherein each cylindrical roller has an elastomeric outer layer.

27. The device of claim 26 wherein a surface of the elastomeric outer layer is ribbed.

28. The device of claim 17 wherein the cylindrical rollers are formed from aluminum, Delrin and Neoprene.

29. The device of claim 17 wherein the first driving means includes a drive motor having a motor shaft, a first sprocket fixedly mounted onto the motor shaft, a drive shaft mounted for rotation on the support frame, an idler sprocket mounted onto the drive shaft; at least one endless moving member extending between the first sprocket and the idler sprocket; and at least one drive sprocket fixedly mounted onto the drive shaft for driving the endless moving member.

30. The device of claim 17 wherein the second driving means comprises a first and second motor, each motor mounted on the support frame, the first motor having a first output shaft and a first drive pulley, the second motor having a second output shaft and a second drive pulley, the second driving means further comprising a first rotatably mounted idler shaft and first idler pulley mounted on the shaft, and a first endless moving member extending from the first drive pulley to the first idler pulley, and a second rotatably mounted idler shaft and a second idler pulley mounted on the shaft, and a second endless moving member extending from the second drive pulley to the second idler pulley, wherein the first and second motors are mounted on opposite sides of the conveyor, wherein the first motor drives a first group of cylindrical rollers in a first direction of rotation at a first selected speed, and the second motor drives a second group of cylindrical rollers in a second direction of rotation at a second selected speed, wherein the rollers of the first group alternate with the rollers of the second group along the conveyor.

31. The device of claim 30 wherein the third driving means comprises a third and fourth motor, each motor mounted on the support frame, the third motor having a third output shaft and a third drive pulley, the fourth motor having a fourth output shaft and a fourth drive pulley, the third driving means further comprising a third rotatably mounted idler shaft and third idler pulley mounted on the shaft, and a third endless moving member extending from the third drive pulley to the third idler pulley, and a fourth rotatably mounted idler shaft and a fourth idler pulley mounted on the fourth shaft, and a fourth endless moving member extending from the fourth drive pulley to the fourth idler pulley, wherein the first and second motors are mounted on opposite sides of the conveyor, wherein the third motor drives a third group of cylindrical rollers in a third direction of rotation at a third selected speed, and the fourth motor drives a fourth group of cylindrical rollers in a fourth direction of rotation at a fourth selected speed, wherein the rollers of the third group alternate with the rollers of the fourth group along the conveyor, and wherein said third driving means drives said third and fourth group of rollers after said rollers disengage from said second driving means.

32. The device of claim 30 wherein said first and second selected speeds are unequal.

33. The device of claim 30 wherein said first selected speed is between about 5 and about 15 percent different than said second selected speed.

34. The device of claim 30 and further comprising a fourth driving means substantially identical to said second driving means for driving said first and second group of rollers after said rollers disengage said third driving means, wherein said first and second selected speeds of the fourth driving means are selected to reverse a direction of rotation of the ears being husked by the second driving means.

35. The device of claim 31 and further comprising a fifth driving means substantially identical to said third driving means for driving said first and second group of rollers after said rollers disengage said fourth driving means, wherein said third and fourth selected speeds of the fifth driving means are selected to reverse a direction of rotation of the ears being husked by the third driving means.

36. The device of claim 31 wherein said third and fourth selected speeds are unequal.

37. The device of claim 31 wherein said third selected speed is between about 5 and about 15 percent different than said fourth selected speed.

38. The device of claim 17 and further comprising means for delivering a stream of gas along a path substantially parallel to a central cylindrical axis of the ear, proximate the central cylindrical axis.

39. The device of claim 38 wherein the means for delivering a stream of air comprises a pair of spaced apart nozzles, the nozzles facing each other and located substantially along a selected axis.

40. The device of claim 39 and further comprising means for delivering a pulsing stream of gas.

41. The device of claim 17 and further comprising means for delivering a stream of air in a direction substantially normal to a plane containing at least two adjacent cylindrical rollers, the cylindrical rollers being positioned for rotation, the direction of air flow being toward the rollers.

42. The device of claim 41 wherein the means for delivering air comprises an air manifold and an air blower fluidly connected to the air manifold for supplying air to the manifold.

43. The device of claim 40 and further comprising programmable means for controlling the first, second and third driving means and for controlling the duration and frequency of the pulses.

44. A method of removing the husks from an ear of corn, the husks being attached to the ear at a butt end, the method comprising:
cutting off at least the butt end of the ear;
positioning the ear between at least one pair of adjacent cylindrical rollers, the rollers being closely spaced, an area between the rollers defining a nip, the adjacent rollers adapted for rotational movement in opposite directions;
rotating a first adjacent cylindrical roller in the pair at a rotational speed exceeding the speed of the other roller, causing the ear to rotate in a first direction along a cylindrical axis of the ear; and
rotating the first adjacent cylindrical roller in the pair at a rotational speed below that of the other roller, causing the ear to rotate in a direction opposite that of the first direction, wherein the ears are rotated in the first and opposite directions for a time sufficient to remove substantially all of the husks, while preventing substantial damage to the kernels.

45. The method of claim 44 wherein said first adjacent roller rotates at a speed between about 5 and about 15 percent faster than the speed of the other adjacent roller.

46. A method of removing the husks from an ear of corn, the husks being attached to the ear at a butt end, the method comprising:
cutting off at least the butt end of the ear;
positioning the ear between at least one pair of adjacent cylindrical rollers, the rollers being closely spaced, an area between the rollers defining a nip, the adjacent rollers adapted for rotational movement in opposite directions;
rotating the pair of cylindrical rollers at a first set of selected rotational speeds and directions so that the ear rotates in a first direction along a cylindrical axis of the ear; and
rotating the pair of cylindrical rollers at a second set of selected rotational speeds and directions so that the ear rotates in a direction opposite the first direction whereby the ear is rotated in a manner sufficient to remove substantially all of the husks, while preventing substantial damage to the kernels.

* * * * *